H. N. POTTER.
APPARATUS FOR THE RECOVERY OF PRECIOUS METALS.
APPLICATION FILED JUNE 7, 1911.
1,030,490.
Patented June 25, 1912.
2 SHEETS—SHEET 1.
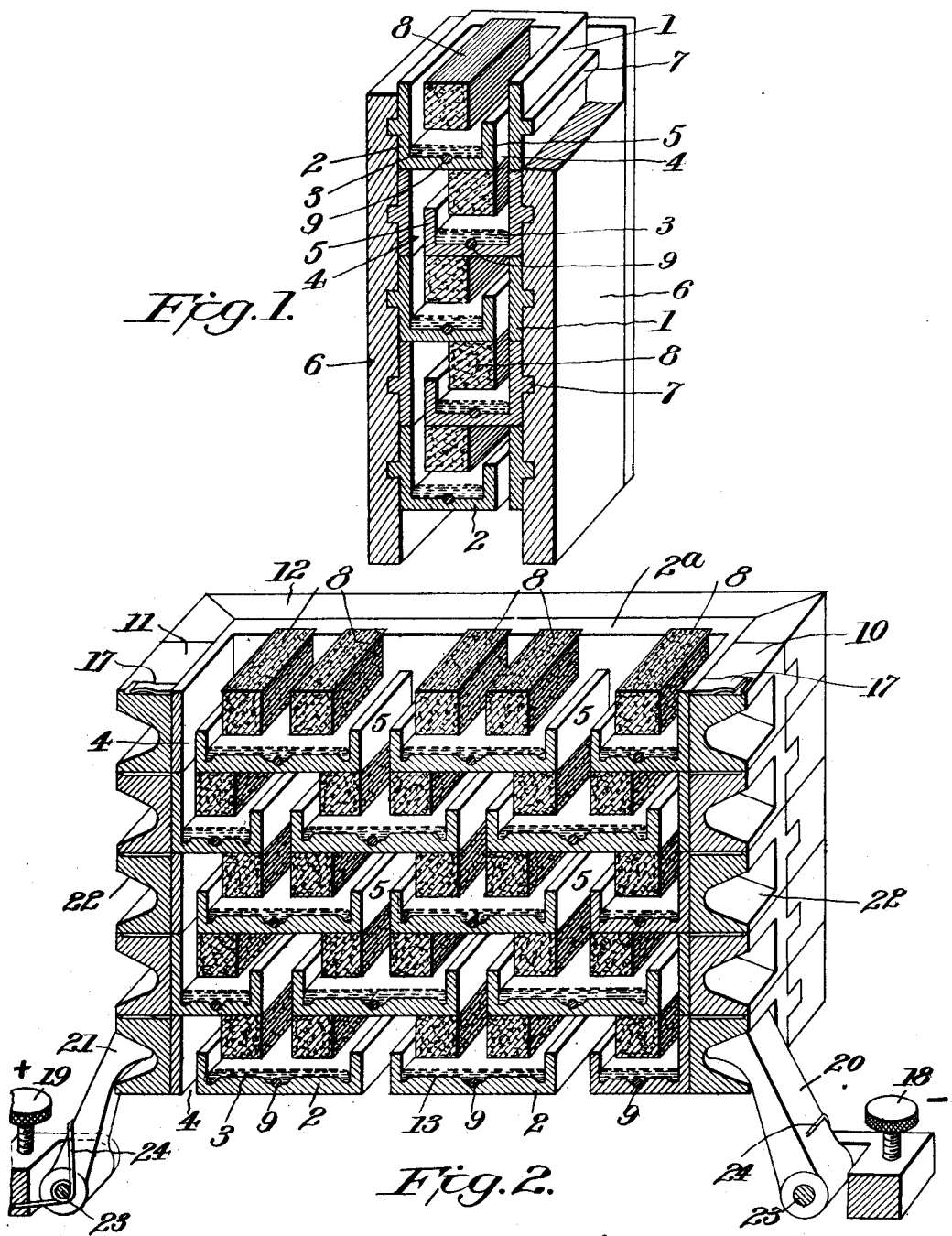

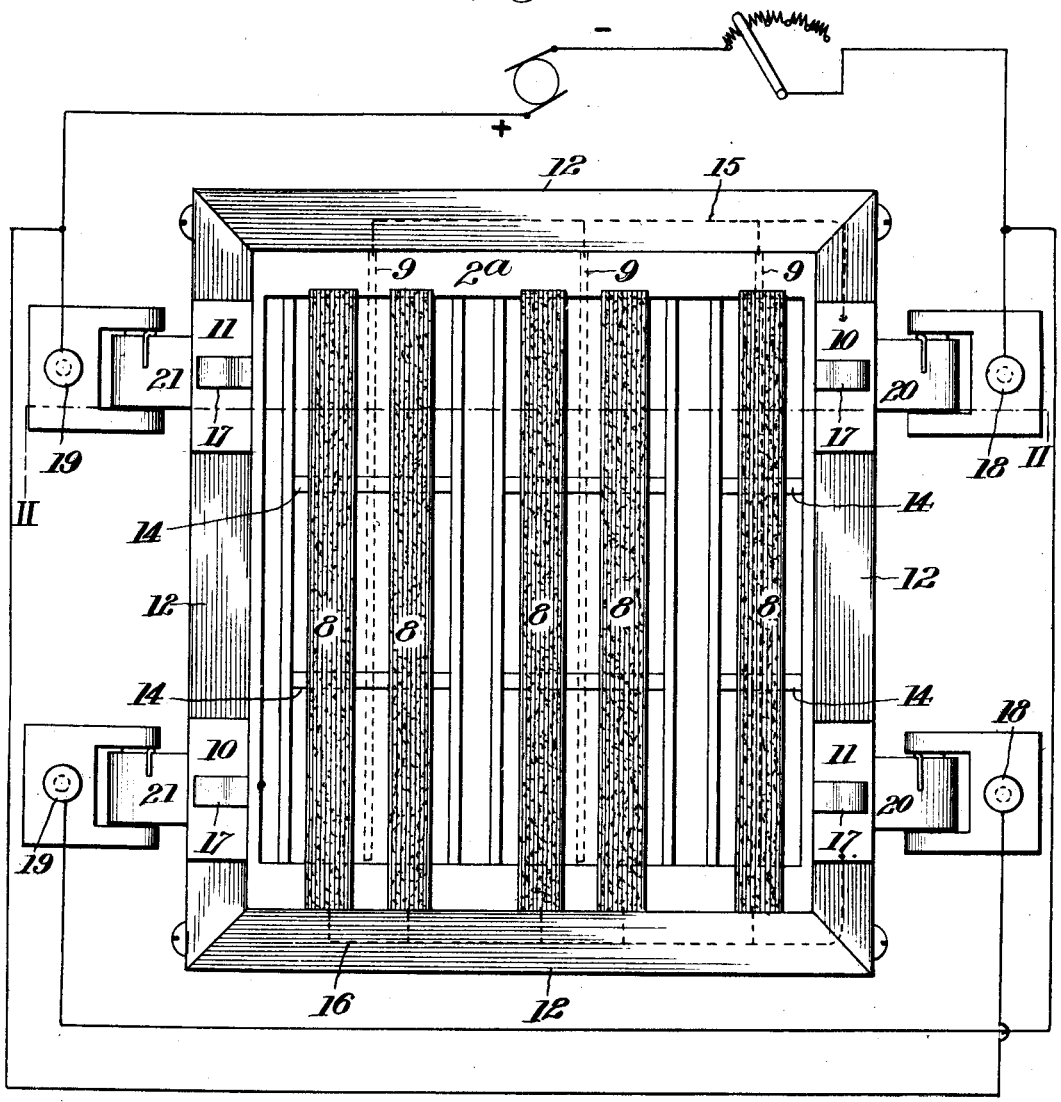

UNITED STATES PATENT OFFICE.

HENRY NOEL POTTER, OF HOLLYWOOD, CALIFORNIA.

APPARATUS FOR THE RECOVERY OF PRECIOUS METALS.

1,030,490.  Specification of Letters Patent.  Patented June 25, 1912.

Application filed June 7, 1911. Serial No. 631,811.

*To all whom it may concern:*

Be it known that I, HENRY NOEL POTTER, a citizen of the United States, residing at Hollywood, in the county of Los Angeles and State of California, have invented certain new and useful Improvements in Apparatus for the Recovery of Precious Metals, of which the following is a specification.

This invention relates to devices for the recovery of precious metals, in particular gold, the primary object of the invention being the provision of an apparatus for recovering the precious metals economically from very low grade materials, even when the metal exists in solution or in the form of very fine particles which do not gravitate rapidly from suspension in water.

According to the invention, I provide a construction wherein a flowing stream of liquid containing the values together with finely-divided and suspended gangue, may follow a tortuous path above a plurality of separate bodies of mercury or amalgam thereof, means being preferably provided for passing an electric current through the flowing stream in such direction that the mercury shall be the cathode of the circuit. In such case the liquid is electrolytically conductive, a condition usually existing to a sufficient degree in natural spring and stream waters, owing to the presence of dissolved mineral salts, but easily and cheaply created in case of exceptionally pure water by adding an inexpensive soluble salt, as for example sodium chlorid.

Certain forms of apparatus embodying my invention are illustrated in the accompanying drawings wherein:—

Figure 1 is a sectional isometric perspective of one form of apparatus illustrative of my invention. Fig. 2 is a similar view on line II—II of Fig. 3, of a modified construction illustrating one mode of securing any desired increase in the capacity of the apparatus; and Fig. 3 is a plan view of the construction shown in Fig. 2.

Referring to said drawings, Fig. 1 represents an apparatus comprising a vertical series of pans, 1, 1, which are preferably molded from a suitable insulating composition as hereinafter more fully described. Each pan 1 comprises a receptacle 2 adapted to receive a body of mercury or mercuric amalgam 3, and a downwardly extending, open passage 4, which is in free communication with the receptacle 2 above a longitudinal retaining partition 5 for the mercury. Any desired number of pans of approximately similar form are assembled in vertical series, but in alternating positions, in such manner that the material overflowing the partition 5 of one pan will be directed in a definite path upon and across the body of mercury in the pan next below. In the particular form of apparatus illustrated in Fig. 1, the several pans are removably carried in a holder casing 6, being supported therein by lateral projections 7, engaging corresponding recesses in the casing.

Above the mercury in each pan, and so disposed therein as to provide a definite path for liquid flowing through the pan, is a baffle 8, the several baffles preferably constituting the electrolytic anodes and being therefore formed of an appropriate conductive material, such, for example, as magnetite, graphite, etc. The cathode connections to the mercury are conveniently made through bars 9, of conducting material, which may with advantage be of iron, steel or nickel, lying upon or in the bottom members of the several pans.

In the operation of the apparatus as above described, the value-bearing stream is introduced into the uppermost pan, flows therethrough in a tortuous path during a part of which it is confined in proximity to the surface of the mercury or amalgam and flows thence to and similarly across the surface of the mercury in each succeeding pan in the series. Much gold occurs native in such fine or flat particles as not to settle rapidly in a moving stream of water, and I have observed that when a stream carrying such gold particles flows over a surface of mercury or of electropositive amalgam the extraction seems to be practically limited to the gold in a thin layer at the bottom of the stream, inasmuch as extending the mercury surface farther in the direction of stream flow does not effect an increase in the extraction anywhere nearly proportional to the increase in the amount of mercury surface. Further extraction is hastened by subjecting the whole stream to a mixing action, and then passing it again over quicksilver or amalgam and repeating this as often as the practical limits of desirable extraction warrant. It is however undesirable violently to disturb the mercury as this tends to "flour" it and cause a loss. I have provided a construction wherein the amalgamating and mixing functions occur practically separately and alternately, and I positively direct the stream without violent agitation across the mercury surfaces and effect adequate mixing in parts of the stream out of contact with the mercury. It is undesirable even in those parts of the construction devoted to mixing to effect violent dashing of the stream as this only increases the abrasion of walls with no compensating advantage. The mixing effected by flowing over a dam or partition is quite adequate and a further mixing is effected in the vertical passages by action of entrained air bubbles.

In the construction illustrated in Figs. 2 and 3, the apparatus is laterally extended by the provision of a multiplicity of pans 2, which together constitute a tray 2ª, set in a suitable frame 12 on the side members of which are electrically conducting pieces 10, 11, the remainder of the frame being of insulating material, as impregnated wood or the like. Any desired number of pans 2 may be assembled in a single tray, the series being extended as desired both laterally and longitudinally. The tray may be a single molded piece of which the pans 2 are integral parts, or may be more or less subdivided as desired into structural units, each containing one or more pans. In Figs. 2 and 3 certain of the pans are shown as of double the effective width as compared with the construction of Fig. 1, each such pan having two parallel spaced anodes 8, between which the stream flows downwardly upon the amalgam, the flow then dividing and passing over the lateral retaining partitions 5, to the tray beneath. The flow as a whole is in what may be termed a multiple path, which is resultantly vertical, irrespective of the path of any particular particle.

Much economy in the quantity of mercury required may be effected by providing in the bottom of the pans raised areas 13, in the channels around which the amalgam is of greater depth than over the raised areas. This greater depth is of advantage at the region where the stream impinges on the surface of the amalgam, also at the sides of the pans where it offsets the capillary depression, which tends to allow the accumulation beneath the mercury of particles of black sand or other dense gangue material. It is also found advantageous in certain cases, as for example when the apparatus is to be used on a boat, to subdivide the pans by low transverse partitions 14 (Fig. 3), which may also serve as supplemental supports for the anodes 8.

With certain ores it is quite practicable to use the apparatus without the adjuncts which permit the employment of electric current, and in this case the baffles 8, usually serving as anodes, may be replaced by impregnated wooden blocks or other suitable material. In the great majority of cases, however, including those cases where the mercury tends to foul or the gold is rusty or where native platinum or platinum metals are present, the electrolytic effects are necessary or desirable although in some cases an intermittent electrolysis is all that is needed. The cathode connection to the mercury is conveniently made by electrical connections extending between the rods 9 and the metal contact 10, as indicated by dotted lines at 15 in Fig. 3; the anode connection is similarly made to the contact 11, as indicated by dotted lines at 16. In the use of the apparatus, when several frames are superposed, the necessary electrical connections to the generator may be made in any desired manner to any frame of the series. In order to insure effective electrical contact between the several superposed metal contacts, it is preferred to provide each of these with contact springs as illustrated at 17, Figs. 2 and 3. The electrical connections to the anodes are conveniently arranged so that the individual anodes are freely removable, electrical contact being made automatically when they are inserted in their respective recesses. One convenient mode of making the electrical connections to the external circuit is illustrated in Figs. 2 and 3, in which the current leads are connected to terminals 18, 19 in conductive relation to the supporting members 20, 21 engaging the lowermost frame.

Practically, it is very important that the apparatus should be designed to facilitate and thereby cheapen the recovery of the values from the apparatus, technically known as the "clean up," and for this purpose as well as to economize the cost of repairs or replacements, to permit any desired variations of capacity, and for other reasons, my invention provides an essentially sectional construction of readily removable units. This may be attained in many different ways. For example, in Fig. 1 I have shown the pans constituting the units as mounted in a holder from which any individual unit may be withdrawn, this system being properly termed "selective." I have found it advantageous in practice, however, that the bodies of mercury or amalgam should be progressively advanced through the series, the fresh mercury being introduced into the system at the point which, as regards the stream, is most remote from the source of supply, and progressively advanced toward such source. This may be termed the "progressive system." According to this system (see Fig. 2) the uppermost unit or tray is removed, and a fresh unit, or the same unit cleaned up and refilled with fresh mercury is inserted at the bottom of the set and the whole set moved up the height of one tray, this course being repeated in regular rotation with the several units following the first in series. For example, in the construction of Figs. 2 and 3 the stream is introduced into the uppermost tray and permitted to flow through the apparatus until this tray has extracted sufficient gold, when it is removed, cleaned and charged with fresh mercury and re-introduced into the system at the bottom, or an equivalent fresh tray introduced, the entire series being for this purpose carried by suitably designed supporting members 20, 21. The metal members of each tray frame are formed with recesses 22, adapted to engage these supports, and by mounting the supports so that they may be retracted, the entire series of tray frames may be raised until the newly inserted tray frame engages the supports. By the use of this or an equivalent progressive construction, the ratio of extraction in the successive trays is taken into account and the upper tray which extracts gold the most rapidly, having the first chance, will give way in due course to the second tray which extracts gold at a rate second only to the top tray, the third becoming the second, etc. As each tray approaches its working maximum gold-content it also approaches the top of the series and thus there is never any doubt as to which tray is nearest ready to clean up, inasmuch as that tray is always the top one; inversely it is never necessary to disturb any tray but the top one as each of the succeeding trays contain less gold than the top one. In the electrolytic system there is an advantage in that the lower trays are thoroughly electrolytically charged before they come into the positions of maximum extraction. The electrolytic action may be maintained on the remainder of the trays during the removal of the top tray and insertion of a fresh bottom tray. Obviously, any arrangement permitting this effect may be used, that shown providing the pawl-like supports 20, 21 adapted to rock upon their shafts, 23, and normally retained in position by springs 24.

The pans for containing mercury or mercuric amalgam are preferably molded, wholly or in part, from the synthetic product known as Bakelite, this name being applied to certain condensation products of phenolic bodies and formaldehyde and to mixtures thereof with other substances, as for example, inert fibrous or other inert filling materials. Such compositions are susceptible of highly accurate molding, whereby the apparatus may be assembled out of simple parts without the use of interlocking joints or gaskets, and the pans or trays thus made are strong, light, hard, impermeable, and electrically non-conducting, all of which qualities adapt them in the highest degree for my present purposes. Furthermore, such molded pans have been found to possess certain other characteristics which are particularly advantageous for use in connection with electric or other amalgamators. Thus: (1.) They are not acted upon by electropositive amalgams or by the products of the electrolysis of electropositive metal salts, or of gold-solvent solutions; (2.) They are distinguished from glass, porcelain and like materials by possessing in addition to much greater accuracy in manufacture, a degree of elasticity or resilience which insures them against seriously rapid abrasion or wear under the action of a stream carrying suspended, hard, solid particles, as sand, etc.; and against easy breakage due to accidental shocks; (3.) They are distinguished from hard rubber, vulcanized fiber and similar materials by their freedom from sulfur or sulfur compounds, which have a deleterious effect upon mercury and its amalgams.

It is understood that the apparatus may be variously modified without departure from my invention. For example, in certain cases it may be desirable to remove and replace the anodes or baffles constituting a horizontal series as a group, instead of individually. This may readily be accomplished by a suitable horizontal subdivision of the several trays, (Fig. 2) whereby the anodes are carried by frames which are separable from the mercury receptacles with which they are correlated when the apparatus is assembled.

It is further to be understood that the apparatus is capable of general use under any conditions involving the employment of cathodes of mercury, as for example, for the electrolytic decomposition of cyanid solutions of gold, as hereinabove mentioned; and that it presents advantages for such use for the reason that the gold is effectively recovered from such solutions without the necessity of first removing the suspended solids by filtration, decantation or the like.

Where the device is to be used for electrolytically depositing gold from solution containing it as a salt, I prefer to make the anodes and cathodes wide and the space between them as narrow as is consistent with the size of ore particles accompanying the solution. I also provide for aeration by passing the solution successively over several sets of trays with intervals between, wherein air is allowed to act on the solution in any effective way.

I further find that it is sometimes advantageous in cyanid treatment of ores to pass the pulp over an amalgamator built as described, before adding the cyanid, as thus the coarse free gold is removed and cyanids are to a large extent rendered harmless by the electrolysis or the products thereof, so that when subsequently the cyanid is added, a lesser quantity of it is required.

The apparatus is compact, highly efficient in the recovery of values, and may be readily and compactly constructed of very great capacity, for all of which reasons it is especially adapted for the recovery of native precious metals from low grade ores or deposits, river sands and placers.

I claim:

1. In apparatus for the recovery of gold, a series of separable, vertically superposed pans, each adapted to contain one or more bodies of mercury or mercuric amalgam and each providing a tortuous stream path or paths, the inlet and discharge orifices of said pans registering throughout the series to provide a continuous inclosed path or set of paths.

2. In electrolytic apparatus for the recovery of gold, a series of separable, vertically superposed pans, each adapted to contain one or more bodies of mercury or mercuric amalgam and each providing a tortuous stream path or paths, the inlet and discharge orifices of said pans registering throughout the series to provide a continuous inclosed path or set of paths, cathode connections to said bodies of mercury, and anodes disposed above and in proximity to said bodies.

3. In apparatus for the recovery of gold, a series of interchangeable, separable, superposed pans each adapted to contain one or more bodies of mercury or mercuric amalgam, a support for the lowermost pan of the series, and means carried by each pan of the series whereby it may engage said support.

4. In apparatus for the recovery of gold, a molded container for amalgam comprising an inert filling material and an inert synthetic organic binder for said filling material.

5. In apparatus for the recovery of gold, a molded container for amalgam presenting interior surfaces of an insoluble and infusible condensation product of phenolic bodies and formaldehyde or a composition thereorf.

6. In electrolytic apparatus for the recovery of gold, a container having a plurality of separate compartments for amalgam, in combination with a cathode connection common to said compartments.

7. In electrolytic apparatus for the recovery of gold, a container having a plurality of separate compartments for amalgam, in combination with a cathode connection common to said compartments, and one or more anodes extending above said compartments.

8. In apparatus for the recovery of gold, a series of separable, interchangeable, vertically superposed pans, each adapted to contain one or more bodies of mercury or amalgam, and each providing a structurally defined stream path or paths across said bodies.

9. In apparatus for the recovery of gold, a series of separable superposed pans, each adapted to contain one or more bodies of mercury or amalgam and each providing a structurally defined stream path or paths across said bodies, cathode connections to said bodies of mercury and anodes disposed in proximity to said bodies.

10. In apparatus for the recovery of gold, a series of separable, interchangeable, superposed amalgam containers and a suitable support for the lowest container.

11. In apparatus for the recovery of gold, a series of progressively removable and replaceable superposed amalgam containers substantially as described.

12. In apparatus for the recovery of gold, a tray consisting essentially of a plurality of containers and a frame therefor, said containers assembled in said frame in spaced relation to each other.

13. An apparatus for the recovery of gold having a multiple, resultantly vertical, inclosed stream path leading over a plurality of amalgamating surfaces arranged in parallel series.

14. An apparatus for the recovery of gold having a multiple, structurally defined stream path through a series of trays each containing a plurality of pans adapted to contain mercury or amalgam.

15. In electrolytic apparatus for the recovery of precious metals, a plurality of separate compartments for amalgam and an anode or anodes each adapted to serve a plurality of said compartments.

In testimony whereof, I affix my signature in presence of two witnesses.

HENRY NOEL POTTER.

Witnesses:
WAKEFIELD PHINNEY,
ANDRÉ MENOUS.

---

Copies of this patent may be obtained for five cents each, by addressing the "Commissioner of Patents, Washington, D. C."

It is hereby certified that in Letters Patent No. 1,030,490, granted June 25, 1912, upon the application of Henry Noel Potter, of Hollywood, California, for an improvement in "Apparatus for the Recovery of Precious Metals," an error appears in the printed specification requiring correction as follows: Page 3, line 130, for the word "cyanids" read *cyanicides;* and that the said Letters Patent should be read with this correction therein that the same may conform to the record of the case in the Patent Office.

Signed and sealed this 19th day of November, A. D., 1912.

[SEAL.]
C. C. BILLINGS,
*Acting Commissioner of Patents.*